United States Patent [19]

Ogilvy

[11] Patent Number: 4,900,456

[45] Date of Patent: Feb. 13, 1990

[54] WELL BORE FLUID

[75] Inventor: Norman Ogilvy, Camberley, England

[73] Assignee: The British Petroleum Company p.l.c., London, United Kingdom

[21] Appl. No.: 279,261

[22] Filed: Dec. 1, 1988

Related U.S. Application Data

[63] Continuation of Ser. No. 52,886, May 22, 1987, abandoned.

[30] Foreign Application Priority Data

May 30, 1986 [GB] United Kingdom ............... 8613222
Oct. 24, 1986 [GB] United Kingdom ............... 8625543

[51] Int. Cl.$^4$ .................... C09K 3/00; F21B 43/16
[52] U.S. Cl. ................. 252/8.551; 252/8.515; 166/268
[58] Field of Search ............... 252/8.551, 8.515, 8.513

[56] References Cited

U.S. PATENT DOCUMENTS

| | | | |
|---|---|---|---|
| 2,217,926 | 10/1940 | Van Campen | 252/8.515 |
| 2,297,660 | 9/1942 | Mazee | 252/8.515 |
| 2,805,722 | 9/1957 | Morgan et al. | 252/8.551 |
| 2,894,584 | 7/1959 | Birdwell et al. | 252/8.551 |
| 2,898,294 | 8/1959 | Priest et al. | 252/8.551 |
| 3,168,475 | 2/1965 | Jordan et al. | 252/8.551 |
| 3,494,865 | 2/1970 | Andrews et al. | 252/8.551 |

OTHER PUBLICATIONS

Halliburton Modern Well Completion (1976) Completion Fluids, pp. 2–11, *Completion, Workover, and Packer Fluids*.

*Primary Examiner*—Howard J. Locker
*Attorney, Agent, or Firm*—Morgan & Finnegan

[57] ABSTRACT

A method for the completion or work-over of a well comprises the step of using a solids-free, non-aqueous well-bore fluid comprising a halogenated organic compound as a completion or work-over fluid. The fluid has a specific gravity in the range 0.9 to 2.3.

Preferred halogenated organic compounds are brominated aromatic ethers, diphenyls, aliphatic hydrocarbons, benzene and alkyl benzenes.

The halogenated organic compound may be dissolved in an organic solvent. The relative proportions may be chosen to provide a well-bore fluid having a desired specific gravity.

The fluids are non-corrosive, thermally stable and non-damaging to formations.

22 Claims, 3 Drawing Sheets

WELL BORE FLUID

This is a continuation of co-pending application Ser. No. 07/052,886, filed on May 22, 1987 (abandoned).

This invention relates to a method for the completion or work-over of a well using a solids-free, non-aqueous well-bore fluid of variable high specific gravity which can be used during or after drilling to complete and/or treat a production or injection well.

The fluids are useful as completion fluids or work-over fluids, jointly termed well-bore fluids, where high stability, low corrosion and absence of solidification are desired.

The term "solids-free" is applied to the basic well-bore fluid having the desired specific gravity. This term is understood in the art to mean that no solid weighting agent is employed. In certain cases, however, solid additives may be added to the well-bore fluid for specific purposes.

Examples of well-bore fluids include drill-in fluids, fracturing fluids, perforating fluids, gravel packing fluids and packer fluids.

After an oil or gas well has been drilled, the casing is perforated to provide access through the casing to the earth formation containing the hydrocarbons to be recovered. This can be done by exploding shaped charges of various types in the casing or by mechanical punch-type casing perforators. In any event, upon perforating the casing, the interior of the well is subjected to the earth formation pressure and requires a counter balanced hydrostatic pressure of fluid in the well to prevent loss of control of the well. In practice, the hydrostatic pressure in the well is usually maintained somewhat higher than that of the earth formation, and some of the fluid in the well often flows through the perforations into the earth formation.

In such instance, it is undesirable to employ drilling muds as the well-bore fluid. The muds, with their solid constituents, tend to plug perforations and, if they enter the earth formation, they can interfere with the proper recovery of the desired hydrocarbon from the reservoir, particularly in sandy formations. In order to avoid such problems, it is common to use a solids-free completion fluid which is maintained in the well to balance the pressure exerted by the earth formation.

Another use for such a fluid, in this context termed "packer fluid", is to exert a hydrostatic head on an annular packer to ensure that the produced oil or gas only issues from the tubing in the well under the control of the well operator. In practice, the packer is placed in the annular space between the casing and tubing, fluid tight, so that the formation products such as gas or oil, are prevented from escaping from the well except through the tubing. This annular space above the packer is then filled with a packer fluid to maintain a hydrostatic pressure on the up-bore or top side of the packer which is about the same, or perhaps slightly greater, than the pressure of the producing formation. By employing such a fluid the formation products produce the same, or slightly less, pressure on the other side or down-bore side of the packer as the added fluid does on the opposite side of the packer. Thus, the removal of any substantial differential pressure across the packer minimizes any tendency for the formation products to bleed or leak around the packer.

In order for a well-bore fluid to be useful in these and other applications, the fluid must have sufficient specific gravity to exert the required hydrostatic pressure, and, preferably, its specific gravity should be capable of being varied to exert the desired amount of hydrostatic pressure to balance the pressure exerted by the earth formation. The hydrostatic pressure of the fluid is based upon the height of the column of fluid in the well and its specific gravity. Since the well depth, and consequently the height of the column of fluid in the well is fixed, the only remaining variable, namely, the specific gravity of the fluid, should be capable of being varied to meet the needs of the hydrostatic pressure required downhole.

This is currently achieved by one of two means. Frequently, dense particulate materials such as barytes or calcium carbonate are suspended in a carrier fluid. A major disadvantage of this method is the migration of these solids into the pay-zone leading to an impairment in hydrocarbon recovery. To alleviate this problem, dense, solids-free, brine solutions of various formulations have been proposed.

Well-bore fluids should be noncorrosive to the ferrous metal tubing and pipes which they contact for prolonged periods. Once a producing well is established and pipe, packer and completion fluid have been installed, replacement of any part of the pipe string, because of corrosion by the completion fluid, amounts to a major undertaking, requiring shut down of the well and a costly and extended period for removal and replacement of the pipe string. In addition, if the corrosion is severe and rapid, loss of control of the well due to pipe rupture is a serious possibility.

Well-bore fluids can be (1) water based, e.g. brines, (2) invert emulsions or (3) oil based systems.

Water based systems are frequently employed, particularly clear brines, but they suffer from the disadvantages that they are sometimes toxic (and therefore require special handling procedures), corrosive (and require the use of well liners and/or corrosion inhibitors), and can recrystallize and show incompatability with reservoir fluids.

They are also subject to foaming problems and are hygroscopic. Absorption of water leads to loss of specific gravity and further control problems. Yet another disadvantage is their tendency to attack elastomeric seals in well-bore equipment.

Invert emulsion fluids can be weighted with acid soluble materials such as calcium carbonate and show little reaction with reservoir clays. The surfactants used to generate the invert emulsion, can, however, damage payzone formations by wettability changes.

Damage to the formation is a particularly acute problem in many wells. This can be caused by solids invasion from solid particles in the well-bore fluid, such as barytes or clay, or fluid invasion by the fluid itself. This can give rise to dispersion and migration of reservoir clays, emulsion blocking and scale precipitation.

Clean crude oil is naturally the least damaging completion fluid to be placed across an oil-bearing formation. However, its use has been seriously limited due to the difficulty in suspending weighting agents in it, and, even if this is overcome, the latter can give rise to problems outlined above.

To overcome these problems we have now devised a novel method for the completion or work-over of a well and a novel well-bore fluid.

Thus according to one aspect of the present invention there is provided a method for the completion or work-over of a well which method comprises the step of using a solids-free, non-aqueous well-bore fluid comprising a halogenated organic compound as a completion or work-over fluid, the fluid having a specific gravity in the range 0.9 to 2.3, preferably 1.5 to 2.2.

The fluid preferably has a Pensky Martens flash point of at least 66° C.

The fluid may consist essentially of the halogenated organic compound itself, e.g. a chlorinated or brominated vegetable oil, ether, or hydrocarbon.

Alternatively, the halogenated organic compound may be dissolved in an organic solvent. The relative proportions may be chosen to provide a well-bore fluid having a desired specific gravity.

The solvent may be another halogenated organic compound of lower specific gravity than the first.

Preferably, however, the solvent is a hydrocarbon solvent such as crude oil, kerosine, diesel oil or a low toxicity drilling oil.

Preferably the halogenated organic compound is a brominated organic compound.

Suitable brominated compounds include brominated aromatic ethers, diphenyls, aliphatic hydrocarbons, benzene and alkyl benzenes.

In the case of alkyl aromatic compounds it is preferred that the bromine substituents should be in the aromatic nucleus only and not in the alkyl side chain. The preferred brominated alkyl benzenes are brominated ethyl benzene and cumene.

Mixtures of isomers and compounds of differing degrees of bromination resulting from bromination reactions are suitable.

According to another aspect of the present invention there is provided a solids-free, non-aqueous well-bore fluid comprising a halogenated organic compound dissolved in a hydrocarbon solvent, the fluid having a specific gravity in the range 0.9 to 2.3, preferably 1.5 to 2.2.

The fluid preferably has a Pensky Martens flash point of at least 66° C.

Suitable halogenated organic compounds and hydrocarbon solvents are as hereinbefore described.

Fluids used in accordance with the present invention are, in general, non-corrosive, thermally stable and non-damaging to formations.

If desired, however, such properties can be modified or enhanced by the use of conventional additives. For example, the viscosity may be increased by the addition of viscosifiers such as polyisobutene and polymers and copolymers of acrylic and methacrylic acids and esters. Thermal stability may be improved by the addition of antioxidants such as secondary aromatic amines and hindered alkyl phenols.

Additional properties may be conferred for specific purposes, again by the use of conventional additives. For example, fracturing fluids require the use of gelling agents such as soaps. In certain formations it may be necessary to use bridging and fluid loss additives such as sized salt or calcium carbonate.

The fluids have low solidification temperatures. In many cases, temperatures at the well head at the earth surface are such that many fluids in the prior art would be subject to freezing or recrystallization in well operations unless special precautions were taken. Since the freezing or recrystallisation temperatures of such fluids may well be above the freezing temperature of water, and in some cases, maybe as high as 10° C. or 15° C., extensive precautions must normally be employed to prevent these fluids from freezing. These include the heating of storage and transport containers for these fluids and the maintenance of heating jackets around the well lines used to carry the fluid into and out of the wall. Such special handling involves considerable operating problems and expense.

Since the fluids are essentially non-aqueous, there is no problem with the swelling of clay-containing structures nor with scale formation. In addition, reservoir compatability is improved.

The invention is illustrated with reference to the following Examples 1 to 7 and FIGS. 1 to 3 of the accompanying drawings.

Figure 1:
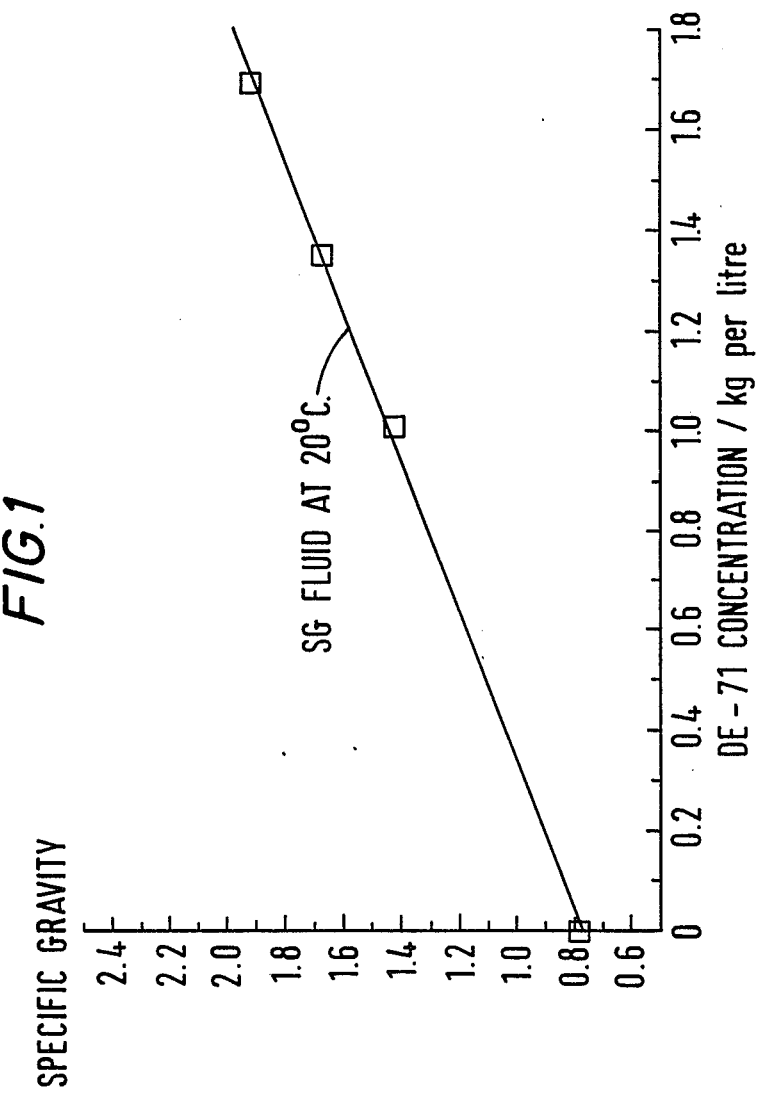
FIG. 1 is a graph showing the relationship between the S.G. of a fluid and the concentration of a densifying agent in a solvent.

In Examples 1–4, the test fluid according to the invention was that identified by the designation NODO 1, which is the name for a series of fluids of differing specific gravities prepared by dissolving differing quantities of a pentabromo diphenyl ether, sold under the Trade Mark DE-71 by Great Lakes Chemical Corporation, in a low toxicity drilling oil, sold by BP Chemicals Ltd under the Trade Name BP 8313, according to the relationship shown graphically in the accompanying FIG. 1.

The proportions can be chosen to give blends of specific gravity ranging from less than 1 to greater than 2.

| BP 8313 has the following properties. | | |
|---|---|---|
| S.G. at 15° C. | | 0.785 |
| Distillation Range (°C.) | | |
| IBPt. | | 195 |
| 50% | | 222 |
| FBPt. | | 255 |
| Flash Pt. | (P-Martens °C.) | 72 |
| Aniline Point | (°C.) | 78 |
| Pour Point | (°C.) | −40 |
| Colour (ASTM D1500) | | below 0.5 |
| Surface Tension | (dynes/cm) | 27.0 |
| Viscosity (cSt) | 0° C. | 3.63 |
| | 20° C. | 2.36 |
| | 40° C. | 1.67 |
| | 60° C. | 1.27 |
| | 80° C. | 1.00 |
| | 100° C. | 0.83 |
| Sulphur | (% mass) | 0.01 |
| Aromatics | (% mass) | 2 |

EXAMPLE 1

Example 1 illustrates the low corrosivity of NODO 1.

The tests were carried out at 65–70° C. for 165 hours on 4140 steel and carbon steel coupons in laboratory glassware using 350 ml of NODO 1 and 500 ml of an established completion fluid based on $ZnBr_2/CaBr_2$ brine. NODO 1 has an SG of 1.91 and the brine of 2.31.

Results set out in the following Table 1 were obtained.

TABLE 1

| Fluid | Coupon Material | Coupon | Mass Before Test/g | Mass After Test/g | % Loss | Visual Assessment |
|---|---|---|---|---|---|---|
| NODO 1 | 4140 | A | 6.9297 | 6.9294 | 0.004 | — |
| | | B | 5.7508 | 5.7502 | 0.010 | — |

TABLE 1-continued

| Fluid | Coupon Material | Coupon | Mass Before Test/g | Mass After Test/g | % Loss | Visual Assessment |
|---|---|---|---|---|---|---|
| | | C | 11.6312 | 11.6304 | 0.007 | — |
| | Carbon Steel | 1 | 6.9236 | 6.9223 | 0.019 | — |
| | | 2 | 5.5126 | 5.5124 | 0.004 | — |
| | | 7 | 6.2575 | 6.2571 | 0.006 | — |
| ZnBr2/ | 4140 | D | 7.0464 | 7.0220 | 0.346 | P, CC |
| CaBr2 | | E | 9.1327 | 9.1137 | 0.208 | FP, CC |
| Brine | | F | 7.6159 | 7.6006 | 0.201 | CC |
| | Carbon Steel | 3 | 6.3051 | 6.2981 | 0.111 | FP |
| | | 8 | 6.2622 | 6.2487 | 0.216 | FP |
| | | 9 | 6.9093 | 6.9001 | 0.133 | FP |

P = Pitting
FP = Fine pitting
CC = Crevice corrosion

The above results indicate that the experimental completion fluid (NODO 1) is not as corrosive as the established completion fluid ($ZnBr_2/CaBr_2$).

EXAMPLE 2

Example 2 illustrates the low level of attack on elastomers by NODO 1, which, in this example, has an SG of 1.7.

The performance of two elastomers exposed to NODO 1 and two comparative media were examined. Table 2 shows the initial physical properties of the elastomers used. NBR 689/4 was a conventional nitrile rubber (ex BP Chemicals Ltd) which has a high (41%) acrylonitrile content with a high (100 pph) loading of SRF carbon black and was vulcanized by a sulphur-donor cure system. Viton GF was a fluorocarbon elastomer obtained from James Walker and Co. Ltd., which was a peroxide cured terpolymer of vinylidene fluoride, hexafluoropropylene and tetrafluoroethylene. Both elastomers showed similar tensile strength data but differed in their modulii and consequent elongation. The nitrile rubber was compounded to possess good resistance to oil, whereas the Viton GF has more general chemical resistance.

The comparative media were a $ZnBr_2/CaBr_2$ brine of SG 1.7 and a $ZnBr_2/CaBr_2$ brine of SG 2.3.

The change in physical properties of the elastomers was measured after exposure to test fluid media for 28 days at 80° C. and are reported as percentage property retention data in Table 3.

Comparison of the data of NODO 1 with the $ZnBr_2/CaBr_2$ brine of SG 1.7 shows that in NODO 1 there was an improvement in the retention of mechanical properties of the nitrile rubber.

The $ZnBr_2/CaBr_2$ brine of SG 1.7 was apparently less aggressive than a similar type brine of SG 2.3. Considerable stiffening of the nitrile rubber was evident in the 1.7 brine but this elastomer became so brittle in the 2.3 brine that it broke too early to allow a modulus measurement. The difference in behaviour between these brines is thought to be due to the fact that the 1.7 brine was of lower gravity than the 2.3 and hence the amount of zinc bromide (thought to be responsible for deleterious action towards nitrile rubber) in the former would be less than in the latter.

TABLE 2

Original Properties for Elastomers used to Test Performance

| Elastomer | Density g/cm³ | T. Str. MPa | Eb % | Modulus (MPa) 50% | Modulus (MPa) 100% | Hardness Shore A |
|---|---|---|---|---|---|---|
| NBR 689/4 | 1.285 | 17.5 | 301 | 3.34 | 6.76 | 80 |
| Viton GF | 1.848 | 17.0 | 152 | 6.07 | 11.40 | 91 |

T.Str = Tensile strength
EB = Elongation at break

TABLE 3

% Properties Retained After Exposure to Fluids for 28 Days at 80 C

| Fluid Elastomer | Vol Retd | Density Retd | Wt Retd | T.Str. Retd | Eb Retd | Mod 100 Retd | Hardness Retd | Visual Rating | Appearance |
|---|---|---|---|---|---|---|---|---|---|
| NODO 1 | | | | | | | | | |
| NBR 689/4 | 129.1 | 116.2 | 149.5 | 98 | 79 | 102 | 87 | 1 | No Visible Effect |
| Viton GF | 102.5 | 98.9 | 101.1 | 79 | 88 | 89 | 97 | 1 | NVE |
| ZnBr2/CaBr2 Brine | | | | | | | | | |
| NBR 689/4 | 103.3 | 104.9 | 107.7 | 113 | 50 | 194 | 107 | 2 | Very Irridescent |
| Viton | 100.8 | 100.1 | 100.3 | 95 | 94 | 102 | 98 | 2 | Very Irridescent |
| ZnBr2/CaBr2 Brine | | | | | | | | | |
| NBR 689/4 | 114.3 | 114.3 | 126.1 | 148 | 10 | 0 | 139 | 2 | Stiff, Curled Edges |
| Viton GF | 100.8 | 99.6 | 99.9 | 97 | 91 | 106 | 97 | 1 | NVE |

Rtd = Retained
Mod 100 = Modulus at 100% extension

EXAMPLE 3

Example 3 illustrates the high thermal stability of NODO 1.

A sample of NODO 1 was held at 176° C. (350° F.) for 64 hours.

No change in SG or viscosity was noted thus indicating that the product was stable at elevated temperature.

TABLE 4

| Temperature °F. | Temperature °C. | Test Period/ hours | Initial Properties SG | Initial Properties Viscosity/cP | Final Properties SG | Final Properties Viscosity cP |
|---|---|---|---|---|---|---|
| 350 | 176 | 64 | 1.909 | 388.7 | 1.908 | 388.7 |

SG measured at 25° C.
Viscosity measured at 20° C.

The pentabromo diphenyl ether itself is relatively unstable, decomposing at temperatures between 220° C. and 320° C.

EXAMPLE 4

This example illustrates the non-damaging effect of NODO 1 on water sensitive structures and the damage done by a completion brine. Both fluids were of SG 1.8.

Two sample plugs were taken from a sandstone core containing about 10% by weight of swelling clays, mainly kaolinite (77–81% of the clay fraction), and smectite (18–23%).

The rock matrix was poorly cemented and the pore system was well developed.

Overall, from petrological data it was predicted that the rock might be liable to significant formation damage from aqueous fluids, as a result of swelling and dispersion of smectite and the mobilization of kaolinite particles. As the rock was inferred to be poorly consolidated, complete matrix disaggregation was envisaged to be a problem if the rock contacted incompatible water-based fluids. Thus, the chosen material was considered to be particularly sensitive to formation damage.

The core-fluid interaction tests were carried out at simulated reservoir conditions i.e. a confining pressure of 4800 psi, pore pressure 2741 psi and a temperature of 64° C. The preserved plugs were flushed initially with kerosine to displace the crude oil. Their permabilities to kerosine were than established at steady-state conditions in forward and reverse flow directions. Oil based completion fluid or the conventional completion brine was then injected at a flow rate of 5ml min-1 and at a pressure differential of 9.97 psi in-1 for the oil based completion fluid, (14 pore volumes). The core permeability to kerosine was re-measured after the treatments, in forward and reverse flow directions.

(i) Water based completion brine

The first plug has an initial permeability to kerosine of 160 md, at a pressure differential across the sample of 2.7 psi in$^{-1}$. The pressure differential was kept low throughout the test to avoid mechanical damage to the rock and/or fines movement, as a result of high fluid seepage forces. After introducing 20 pore volumes of the conventional, water based $ZnBr_2/CaBr_2$ completion brine (corresponding to fluid flux of 18.2 ml/cm$^3$ of rock face) into the sample, the core's permeability to kerosine declined to 57.8 md in reverse flow, and 30.7 md in forward flow. The kerosine flow rate was maintained at 9.2 ml min$^{-1}$, with an average pressure differential of 11.52 psi in-1across the core, after injection of the test fluid. This represented at 72% reduction in the plug's permeability as a result of the brine treatment. The reason for the discrepancy in the measurements with flow direction is not immediately apparent; these differences were not observed prior to injection of the test fluid. No fines were eluted from the core.

It is likely that this permeability damage resulted from swelling of the pore-lining clays.

(ii) NODO 1

The second plug had an initial average permeability to kerosine of 35 md at a pressure differential of 12.4 psi in$^{-1}$. Its permeability increased gradually with increasing kerosine throughput. This trend was attributed to removal of residual crude oil from the rock matrix.

13.8 pore volumes of the NODO 1 oil based completion fluid, i.d. a fluid flux of 15.4 ml/cm$^2$ of rock face, were injected through the core. The plug's permeability to kerosine at steady-state conditions increased to about 46 md after the treatment. As for the water based completion brine treatment, the plug permeability varied slightly after the treatment, depending upon fluid flow direction. In reverse flow the permeability was 46 md; in forward flow it was 42 md. The reason for this discrepancy is not clear at present. No fines were detected during the experiment.

Figure 2:
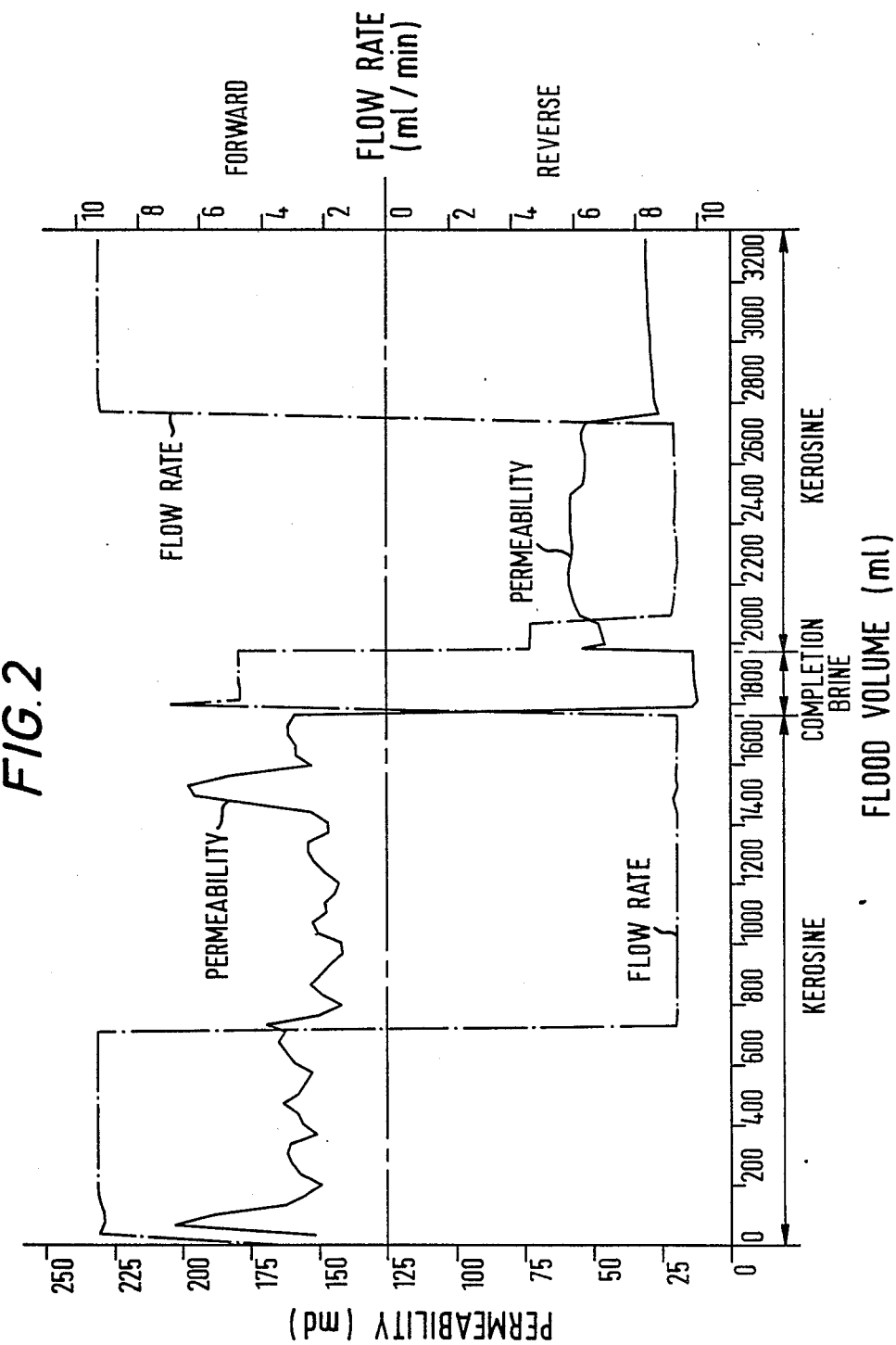
FIG. 2 and 3 are figures showing how the permeability of a core is affected by treatment according to the present invention.
Figure 3:
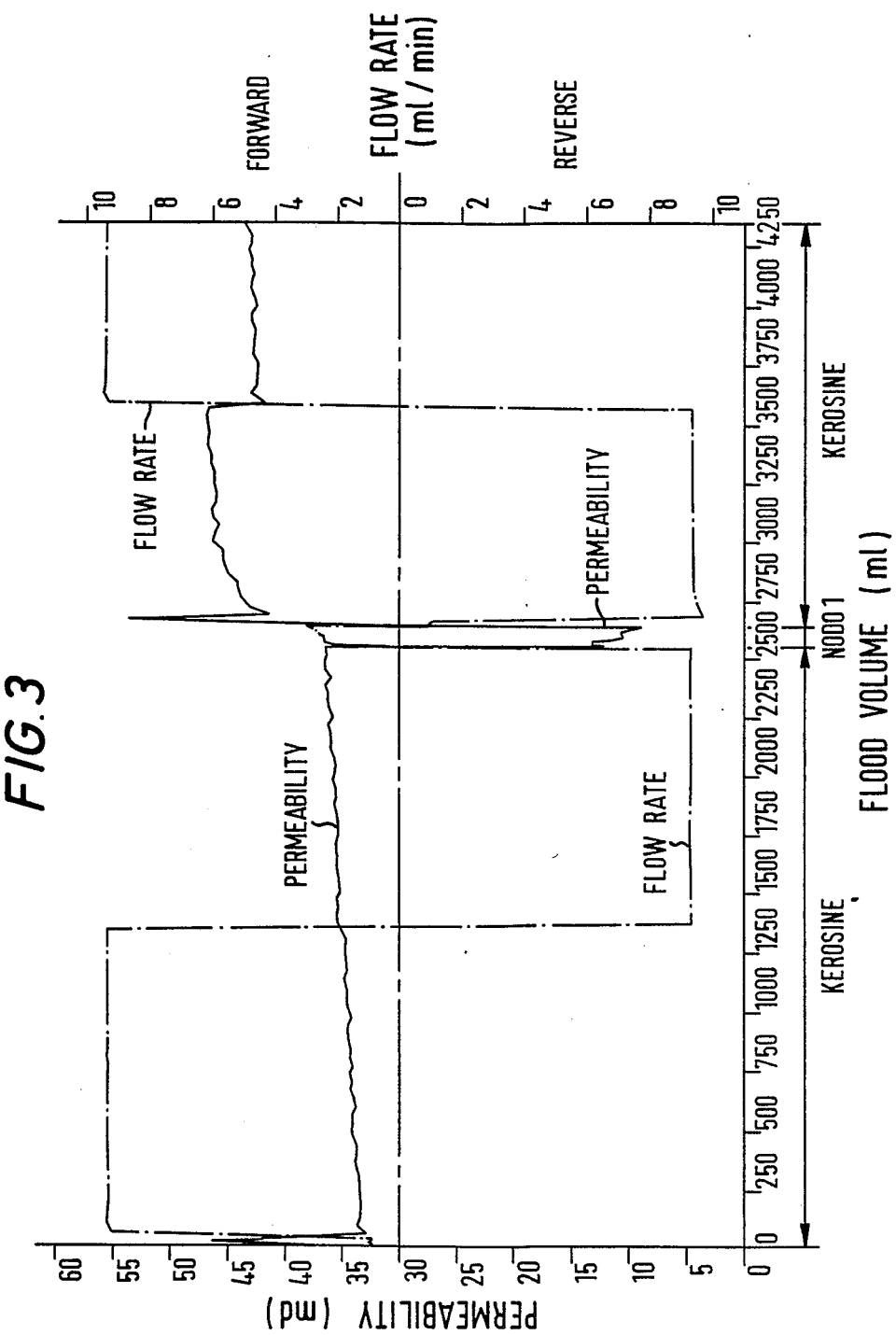

The results of these tests are shown graphically in FIGS. 2 and 3 of the accompanying drawings wherein FIG. 2 shows how the permeability of the core is affected by the flow of completion brine and FIG. 3 by the flow of NODO 1.

The $ZnBr_2/CaBr_2$ aqueous completion brine caused a substantial decrease in the permeability of the reservoir material to kerosine. In contract NODO 1 caused no damage to the core and actually slightly improved its permeability to kerosine.

EXAMPLE 5

Bromine (179.8g, 58.0ml, 4.5 equivalents, 1.125 mole) was added dropwise over 1.5 hours to a stirred suspension of ethylbenzene (26.50g, 0.25 mole), iron powder (2.60g) and carbon tetrachloride (50ml) at 8–10° C. under nitrogen. After the addition was complete the mixture was stirred at 25–30° C. for 1 hour and then slowly treated (with cooling and stirring) with aqueous sodium metabisulphite (0.63molar, 30ml). The organic layer was separated and washed with further aqueous metabisulphite (2×30ml), aqueous sodium carbonate (0.70 molar, 30ml) and water (2×50ml). The organic extract was then dried ($MgSO_4$) and evaporated giving the brominated product as a mobile light yellow oil (89.3g, 77%).

The products were analysed for specific gravity, and bromine content by X-ray fluorescence and by 60 $MH_z^1H$ nuclear magnetic resonance. By calculating the ratio of aliphatic to aromatic protons via NMR integration a measure of the products' bromine content could be obtained. These values were in good agreement with the analytical figures. Results are set out in the following Table 5.

EXAMPLE 6

The general procedure of Example 5 was repeated at ambient temperature (10–16° C.) and using less solvent (25ml).

Results are set out in the following Table 5.

EXAMPLE 7

The general procedure of Example 5 was repeated using a cumene feedstock. Detailed experimental conditions and results are set out in the following Table 5.

TABLE 5

| | | | | | | | Product | | |
| | | | | | | | | $^1$HNMR | |
| Ex. | Feedstock | Bromine Equivalents | Temperature of addition | Vol. solvent Vol. Br$_2$ | % Yield | Descrip | % Br | % Br | av no of bromines | S.G at 20° C. |
| --- | --- | --- | --- | --- | --- | --- | --- | --- | --- | --- |
| 5 | Ethylbenzene | 4.5 | 8–10 | 0.86 | 77 | liquid | 69.5 | 71.8 | 3.28 | 2.21 |
| 6 | Ethylbenzene | 4.5 | 10–16 | 0.43 | 84 | liquid | 70.2 | 73.0 | 3.48 | 2.21 |
| 7 | Cumene | 4.0 | 11–24 | 0.49 | 84 | liquid | 70.1 | 64.8 | 2.70 | 2.11 |

ETHYLBENZENE

In both Examples 5 and 6 mobile liquid products of high density were obtained.

NMR studies ($^1$H and $^{13}$C) indicated the presence to two major isomers in Example 6, viz

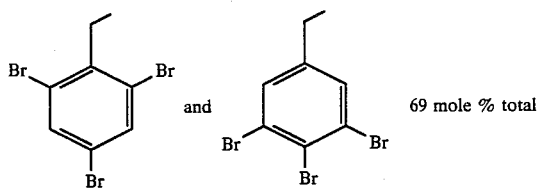

and 69 mole % total plus 3 further components.

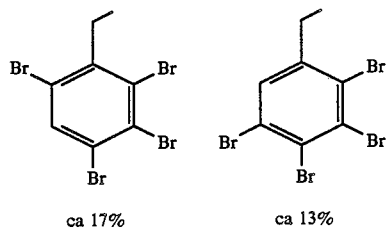

ca 17%   ca 13%

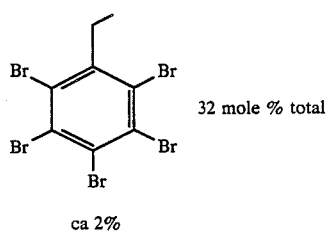

ca 2%

Gas chromatography and mass spectral analysis indicated the following pattern of brominated products.

| n | mol % |
|---|---|
| 3 | 65 |
| 4 | 28 |
| 5 | 6 |

There was no evidence of side chain bromination.

CUMENE

A mobile liquid of high density was again obtained Example 7. NMR studies ($^1$H and $^{13}$C) indicated the following composition:

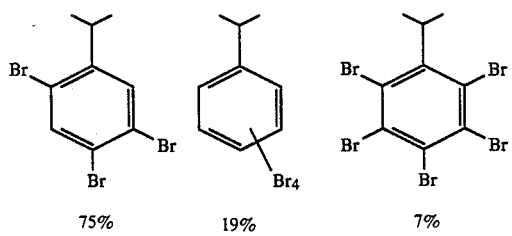

75%   19%   7%

GC/MS showed the following brominated products:

| n | mole % |
|---|---|
| 3 | 73 |
| 4 | 21 |
| 5 | 5 |

Again, there was no evidence of side-chain bromination from NMR or GC/MS.

The products of Examples 5–7 are suitable for use as well bore fluids, either neat or in diluted form to give a fluid with any desired density between that of the diluent itself and the brominated product, as the results in the following Table 6 show.

TABLE 6

| Sample | Viscosity cP | | | | S.G. Room Temp |
|---|---|---|---|---|---|
|  | −20° C. | −10° C. | 0°C. | 40° C. |  |
| Brominated ethylbenzene Example 6 | Solid | 333 | TFTM | 13 | 2.21 |
| Brominated cumene Example 7 | 360835 | 16790 | 2732 | 39 | 2.11 |
| 10% JP5/90% brominated ethylbenzene | Solid | 150 | TFTM | 6 | 1.88 |
| 10% JP5/90% brominated cumene | 1455 | 322 | TFTM | 11 | 1.82 |

TFTM = too fast to measure

JP 5 is an odourless kerosine solvent, typically boiling in the range 190° C.–255° C., S.G. 0,785 and Pensky Martens flash point 72° C.

The brominated cumene product was found to be a liquid across a wide temperature range (−20° to 40° C.), both neat and in 10% solution. Although the brominated ethylbenzene and its 10% solution were solid at −20° C., this is a very severe test and pumpable fluids were obtained above −10° C.

I claim:

1. A method for the completion or work-over a well which method comprises the steps of injecting or pumping a solids-free, non-aqueous, well-bore fluid into the well and maintaining a hydrostatic pressure on the formation to control formation pressure, said well-bore fluid comprising a halogenated organic compound as a completion or work-over fluid, the fluid having a specific gravity in the range 0.9 to 2.3.

2. A method according to claim 1 wherein the fluid has a specific gravity in the range 1.5 to 2.2.

3. A method according claim 1 wherein the fluid has a Pensky Martens flash point of at least 66° C.

4. A method according to claim 1 wherein the halogenated organic compound is dissolved in an organic solvent.

5. A method according to claim 4 wherein the solvent is a hydrocarbon solvent.

6. A method according to claim 5 wherein the solvent is crude oil, kerosine, diesel oil or a low toxicity drilling oil.

7. A method according to claim 1 wherein the halogenated organic compound is a brominated organic compound.

8. A method according to claim 7 wherein the brominated organic compound is a brominated aromatic ether.

9. A method according to claim 8 wherein the brominated aromatic ether is a brominated diphenyl ether.

10. A method according to claim 7 wherein the brominated organic compound is a brominated aliphatic hydrocarbon.

11. A method according to claim 7 wherein the brominated organic compound is a brominated benzene or alkyl benzene.

12. A method according to claim 11 wherein the brominated alkyl benzene is brominated ethyl benzene or cumene.

13. A solids-free, non-aqueous well-bore fluid comprising a halogenated organic compound dissolved in a hydrocarbon solvent, the fluid having a specific gravity in the range 0.9 to 2.3.

14. A fluid according to claim 13 wherein the fluid has a specific gravity in the range 1.5 to 2.2

15. A fluid according to claim 13 wherein the fluid has a Pensky Martens flash point of at least 66° C.

16. A fluid according to claim 13 wherein the hydrocarbon solvent is crude oil, kerosine, a diesel oil or a low toxicity drilling oil.

17. A fluid according to claim 13 wherein the halogenated organic compound is a brominated organic compound.

18. A fluid according to claim 17 wherein the brominated organic compound is a brominated aromatic ether.

19. A fluid according to claim 18 wherein the brominated aromatic ether is a brominated diphenyl ether.

20. A fluid according to claim 17 wherein the brominated organic compound is a brominated aliphatic compound.

21. A fluid according to claim 17 wherein the brominated organic compound is a brominated benzene or alkyl benzene.

22. A fluid according to claim 21 wherein the brominated alkyl benzene is brominated ethyl benzene or cumene.

* * * * *